US009066047B2

(12) United States Patent
Paiz (10) Patent No.: US 9,066,047 B2
(45) Date of Patent: Jun. 23, 2015

(54) APPARATUS, SYSTEMS, AND METHODS FOR ACCESSING AN INTERACTIVE PROGRAM

(75) Inventor: Casey Paiz, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1223 days.

(21) Appl. No.: 11/960,508

(22) Filed: Dec. 19, 2007

(65) Prior Publication Data

US 2009/0165047 A1 Jun. 25, 2009

(51) Int. Cl.
| H04N 7/173 | (2011.01) |
| H04N 7/16 | (2011.01) |
| H04N 5/445 | (2011.01) |
| H04N 21/431 | (2011.01) |
| H04N 21/435 | (2011.01) |
| H04N 21/462 | (2011.01) |
| H04N 21/4722 | (2011.01) |
| H04N 21/81 | (2011.01) |

(52) U.S. Cl.
CPC ......... *H04N 5/44543* (2013.01); *H04N 21/431* (2013.01); *H04N 21/435* (2013.01); *H04N 21/4622* (2013.01); *H04N 21/4722* (2013.01); *H04N 21/812* (2013.01)

(58) Field of Classification Search
USPC ..................................... 725/37–61
See application file for complete search history.

(56) References Cited

U.S. PATENT DOCUMENTS

| 6,415,438 | B1* | 7/2002 | Blackketter et al. | 725/136 |
| 6,665,869 | B1* | 12/2003 | Ellis et al. | 725/39 |
| 7,263,711 | B1* | 8/2007 | Estipona | 725/112 |
| 7,320,134 | B1 | 1/2008 | Tomsen et al. | 725/32 |
| 7,369,520 | B2 | 5/2008 | Luoma et al. | 370/312 |
| 7,668,928 | B2* | 2/2010 | Newnam et al. | 709/216 |
| 2002/0059644 | A1* | 5/2002 | Andrade et al. | 725/136 |
| 2002/0078467 | A1* | 6/2002 | Rosin et al. | 725/110 |
| 2002/0112249 | A1* | 8/2002 | Hendricks et al. | 725/136 |
| 2003/0023971 | A1* | 1/2003 | Martinolich et al. | 725/32 |
| 2003/0227567 | A1* | 12/2003 | Plotnick et al. | 348/552 |
| 2004/0010806 | A1* | 1/2004 | Yuen et al. | 725/136 |
| 2004/0015998 | A1* | 1/2004 | Bokor et al. | 725/136 |
| 2004/0261130 | A1* | 12/2004 | Leak et al. | 725/136 |
| 2005/0015796 | A1* | 1/2005 | Bruckner et al. | 725/32 |
| 2005/0235331 | A1* | 10/2005 | Lynch | 725/100 |
| 2006/0037044 | A1* | 2/2006 | Daniels | 725/39 |

(Continued)

FOREIGN PATENT DOCUMENTS

WO 2007/083824 7/2007

OTHER PUBLICATIONS

Extended European Search Report, dated Oct. 27, 2011, for EP Application No. 08172453.6, 8 pages.

*Primary Examiner* — Mushfikh Alam
(74) *Attorney, Agent, or Firm* — Seed IP Law Group PLLC (57) ABSTRACT

An embodiment of an interactive program and access trigger system receives a signal having a program, an interactive program, and an access trigger therein; presents the program and the access trigger on a presentation device; receives selection of the access trigger; loads the interactive program in response to selection of the access trigger; continues presentation of the program during the loading of the interactive program; and changes from presentation of the program to presentation of the interactive program in response to completion of the loading of the interactive program.

17 Claims, 7 Drawing Sheets

(56) References Cited

U.S. PATENT DOCUMENTS

| | | |
|---|---|---|
| 2007/0107030 A1 | 5/2007 | Zigmond ............... 725/110 |
| 2007/0186269 A1* | 8/2007 | Malik .................. 725/135 |
| 2007/0266404 A1 | 11/2007 | Estipona ................ 725/51 |
| 2007/0266413 A1* | 11/2007 | Davis et al. ........... 725/100 |
| 2007/0298882 A1* | 12/2007 | Marks et al. ............ 463/36 |
| 2007/0300273 A1 | 12/2007 | Turner |
| 2007/0300280 A1* | 12/2007 | Turner et al. .......... 725/135 |
| 2008/0168500 A1* | 7/2008 | Carlson et al. .......... 725/46 |
| 2008/0196071 A1* | 8/2008 | Manthoulis ............ 725/100 |
| 2009/0019476 A1* | 1/2009 | Ohlfs et al. ............. 725/38 |
| 2009/0328109 A1* | 12/2009 | Pavlovskaia et al. ...... 725/70 |
| 2010/0169913 A1 | 7/2010 | Ellis ..................... 725/25 |
| 2010/0175080 A1* | 7/2010 | Yuen et al. .............. 725/32 |
| 2011/0067045 A1* | 3/2011 | Matheny et al. .......... 725/13 |

* cited by examiner

APPARATUS, SYSTEMS, AND METHODS FOR ACCESSING AN INTERACTIVE PROGRAM

TECHNICAL FIELD

The technical field relates to apparatus, systems and methods for accessing interactive programs provided by audio/video/data content providers and, more particularly, to apparatus, systems and methods for communicating the interactive program and a selectable access trigger.

BACKGROUND

A received program may be communicated from a receiving device to a presentation device for presentation. For example, a receiving device may receive a signal with a plurality of television shows therein. The receiving device processes the received signal to obtain the television show, and then communicates the television show to a television. The television then displays the television show. The viewer is able to switch "channels" on the television from one channel to another channel with little or no real-time delay.

At various times, a viewer selectable access trigger may be concurrently presented on the presentation device with the presented program. Upon selection of the access trigger, presentation is changed from the program to an interactive program associated with the access trigger. However, changing presentation to the separately delivered interactive program may require at least some noticeable amount of time. For example, time is required for the receiving device to re-tune to a signal with the interactive program therein. Additional time is required to download, process, and launch the interactive program. That is, unlike video and audio streams, which are substantially complete at the time of delivery, at least some portion of an interactive program is downloaded and processed before the interactive program is launched and presented on the presentation device.

Further, when the re-tuning to the signal with the interactive program occurs, the program is no longer available for presentation because the signal with the program therein is no longer receivable. The processes of retuning, downloading, processing, and launching, which is performed during a period when the program is not available for presentation, results in an interim period where neither the program or the interactive program is available for presentation. During this interim period one or more screen shots, splash screens, or the like may be temporarily presented on the presentation device. This delay in presenting the interactive program is undesirable, and may be annoying to the viewer.

SUMMARY

Apparatus, systems, and methods are disclosed for presenting an access trigger on the currently viewed program, such that when the access trigger is selected, the interactive program that is delivered on the same channel is downloaded and presented. One embodiment receives a signal having a program, an interactive program, and an access trigger therein; presents the program and the access trigger on a presentation device; receives selection of the access trigger; loads the interactive program in response to selection of the access trigger; continues presentation of the program during the loading of the interactive program; and changes from presentation of the program to presentation of the interactive program in response to completion of the loading of the interactive program.

According to another embodiment, a system includes a tuner operable to receive a signal having a program, an interactive program, and an access trigger therein; a processing system communicatively coupled to the tuner and operable to process the received program and the access trigger into a signal for presentation of the program and the access trigger on a presentation device; and a user interface device communicatively coupled to the processing system and operable to communicate a selection of the access trigger by a user to the processing system, where in response to communicating the selection of the access trigger to the processing system, the processing system loads the interactive program, continues presentation of the program during the loading of the interactive program, and changes from presentation of the program to presentation of the interactive program in response to completion of the loading of the interactive program.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

A. Interactive Program and Access Trigger System Overview

Figure 1:
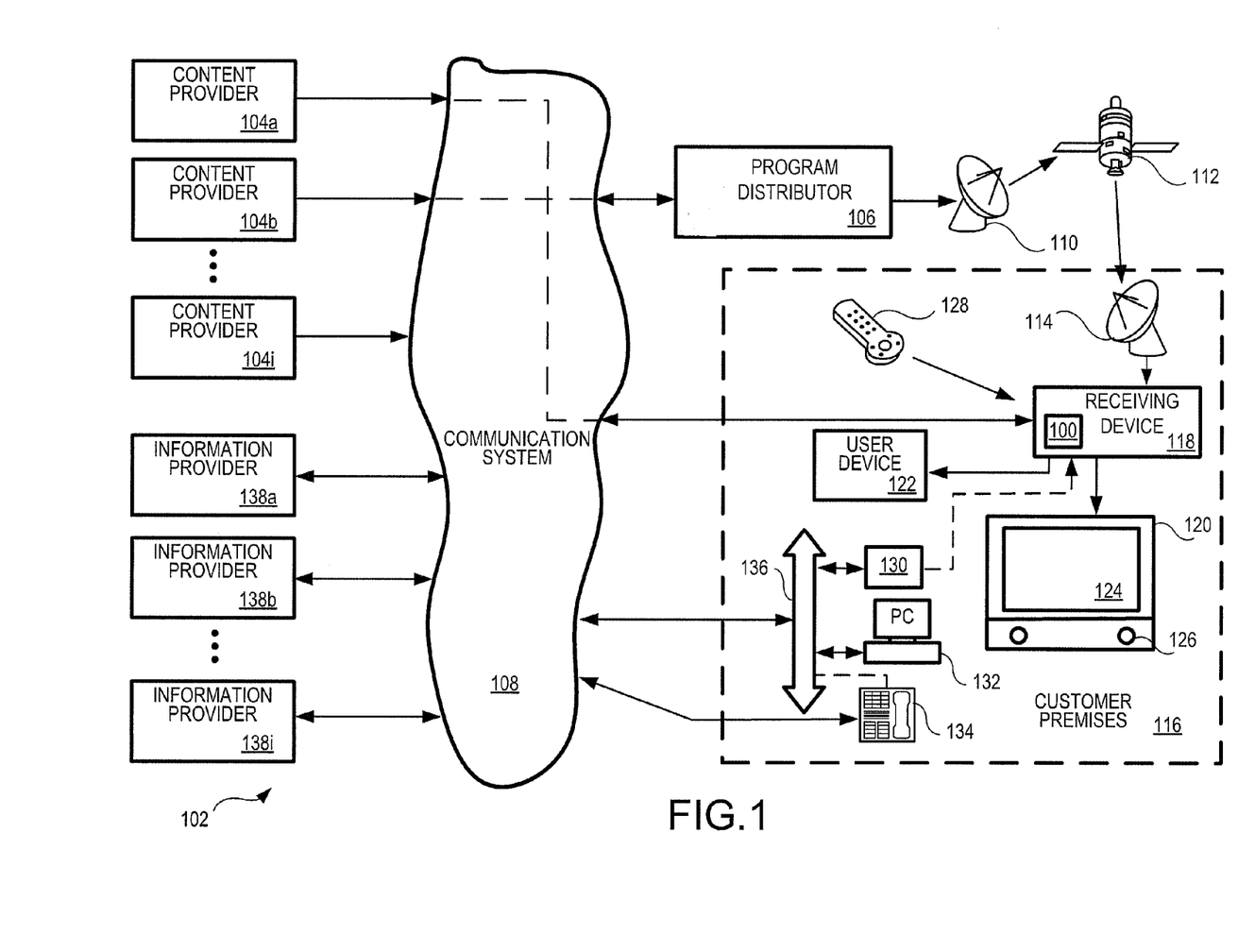
FIG. 1 is a block diagram illustrating an exemplary embodiment of the interactive program and access trigger system.

FIG. 1 is an overview block diagram illustrating an exemplary communication network 102 in which embodiments of the interactive program and access trigger system 100 may be implemented. It is to be appreciated that FIG. 1 is just one example of a communications network and that the various embodiments discussed herein are not limited to the exemplary network of FIG. 1. Communication network 102 may include a variety of communication systems and may use a variety of communication media including, but not limited to, satellite wireless media.

Embodiments of the interactive program and access trigger system 100 present an access trigger on a presentation device concurrently with a presented program. The access trigger is selectable by the viewer. Upon selection, interactive programming is received by a receiving device and loaded such that the interactive content is presentable on the presentation device. During the receiving and loading process for the interactive programming, presentation of the program continues in an uninterrupted manner. When a sufficient portion of the interactive programming is available for presentation on the presentation device, presentation changes from the presented program to the interactive program.

Audio/Video/Data service providers, such as, but not limited to Television service providers, provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

Receiving device 118 interconnects to one or more communications media or sources (such as a cable head-end, satellite antennae, telephone company switch, Ethernet portal, off-air antennae, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "personal computer," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television (TV), a personal computer (PC), a sound system receiver, a digital video recorder (DVR), a compact disk (CD) device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118.

Some customer premises 116 may include an optional network 136, or a networked system, to which receiving devices 118, presentation devices 129, and/or a variety of user devices 122 can be coupled, collectively referred to as endpoint devices. Non-limiting examples of network 136 include, but are not limited to, an Ethernet, a twisted pair Ethernet, an intranet, a local area network (LAN) system, or the like. One or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices and the receiving device 118 to communicate with each other.

Embodiments of the interactive program and access trigger system 100 receive a program, an interactive program, and at various times, at least one access trigger in an output signal. Thus, when a user selects a presented access trigger, no channel switching and re-tuning is required to access the interactive program since the receiving device is tuned to a signal that has both the program and the interactive program therein. Program presentation continues while the interactive program is prepared for presentation. When the interactive program is ready for presentation, presentation changes from the program to the interactive program. Thus, the viewer is presented a substantially seamless change, with little or no noticeable time delay, from presentation of the program to presentation of the interactive program. In at least one embodiment, the interactive program relates to the program that is concurrently displayed with the access trigger.

B. Communication System Overview

A plurality of content providers 104a-104i provide program content, such as video content and/or audio content, to a distributor, such as the program distributor 106. At least some of the content providers 104a-104i may include television stations which provide local or national video programming, special content providers which provide premium based programming or pay-per-view programming, and/or radio stations which provide audio programming. In addition, or in the alternative, at least some of the content providers 104a-104i may include internet protocol television ("IPTV"), which provide audio, video, and other types of data services via Internet Protocol over the communication system 108 and/or other network infrastructure.

A plurality of information providers 138a-138i may also be coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, cable networks, fiber optic networks, microwave networks, asynchronous transfer mode (ATM) systems, frame relay networks, digital subscriber loop (DSL) systems, radio frequency (RF) networks, and satellite systems. Further, program content communicated from the content providers 104a-104i to the program distributor 106 may be communicated over combinations of media. For example, a television broadcast station may initially communicate program content, via an RF signal or other suitable medium, which is received and then converted into a digital signal suitable for transmission to the program distributor 106 over a fiber optics network. As another nonlimiting example, an audio content provider may communicate audio content via its own satellite system to the program distributor 106.

The received program is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

An antenna 114 that is within reception range of the downlink signal communicated from satellite 112 receives the above-described downlink signal. Some types of receiver antenna 114 are operable to receive signals from a single satellite 112. Other types of antenna 114 are operable to receive signals from multiple satellites 112.

The antenna 114 can be located at a customer premises 116. Examples of customer premises 116 include a residence, a business, a car, or any other suitable location operable to receive signals from satellite 112. Often, the antenna 114 is of a parabolic dish shape. Antenna 114 may be mountable on a structure, such as the side or roof of a structure. Other antenna configurations can include, but are not limited to, phased arrays, wands, or other dish shapes. The received signal is communicated, typically over a hard-wire connection, to a receiving device 118 that converts the received signal into a signal suitable for communication to a presentation device 120 and/or a user device 122.

The receiving device 118 may receive content partially from, or entirely from, another source other than the above-described antenna 114. Other embodiments of the receiving device 118 may receive locally broadcast RF signals, and/or may be coupled to communication system 108 via any suitable medium. Non-limiting examples of media communicatively coupling the receiving device 118 to communication system 108 include cable, fiber optic, radio frequency, or Internet media.

User device 122 may be any suitable device that is operable to receive a signal from the receiving device 118, another endpoint device, or from other devices internal and/or external to the customer premises 116. Additional non-limiting examples of user device 122 include optical media recorders, such as a compact disk (CD) recorder, a digital versatile disc or digital video disc (DVD) recorder, a digital video recorder (DVR), or a personal video recorder (PVR). User device 122 may also include, but is not limited to, game devices, magnetic tape type recorders, RF transceivers, and personal computers (PCs). Practically any consumer or other electronics device may be considered as a user device 122 herein.

Interface between the receiving device 118 and a user (not shown) may be provided by a hand-held remote device 128. Remote 128 typically communicates with the receiving device 118 using a suitable wireless medium, such as infrared (IR), RF, or the like. Remote 128 includes a plurality of buttons, controllers or actuators which have an associated operating function, also referred to as a "focus", that is used to communicate commands to the receiving device 118 when the buttons, controllers or actuators are actuated. Other devices (not shown) may also be communicatively coupled to the receiving device 118 so as to provide user instructions. Non-limiting examples include game device controllers.

Customer premises 116 may include other devices which are communicatively coupled to communication system 108 via a suitable media. For example, personal computer (PC) 132 may be communicatively coupled to the communication system 108 via the network 136. Alternatively, devices in the customer premises 116 may be directly connected to the communication system 108, such as the telephone 134 which may employ a hardwire connection or an RF signal for coupling to communication system 108.

The above description of the communication network 102, and the various devices therein, is intended as a broad, non-limiting overview of an exemplary environment in which various embodiments of the interactive program and access trigger system 100 may be implemented. The communication network 102, and the various devices therein, may contain other devices, systems and/or media not specifically described herein.

C. Communication of a Program, an Interactive Program, and Access Triggers

Figure 2:
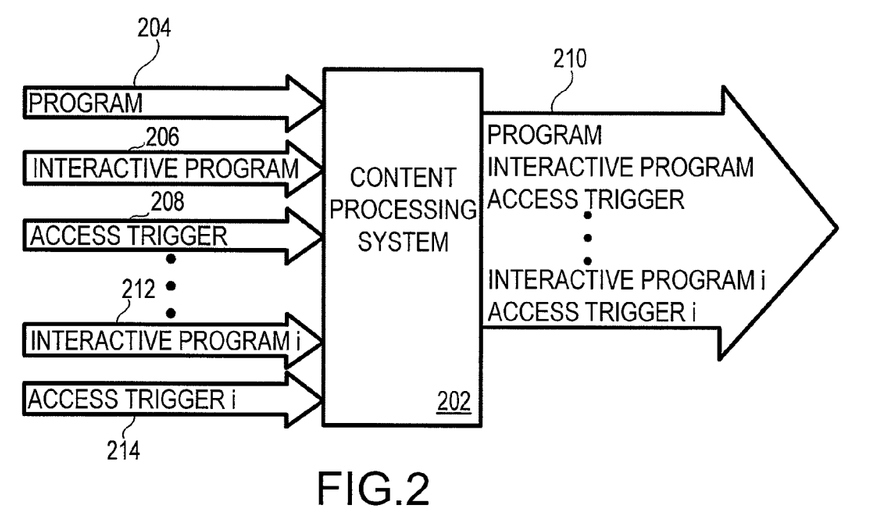
FIG. 2 is a block diagram of a content processing system operable to combine a program, an associated interactive program, and at least one access trigger into an output signal.

FIG. 2 is a block diagram of an exemplary embodiment of a content processing system 202 operable to combine program 204, associated interactive program 206, and at least one access trigger 208 into output signal 210. Signal 210 may include other interactive programs 212 and/or their associated access triggers 214. As noted above, content providers 104a-104i provide program 204 and/or interactive program 206 to the program distributor 106, via communication system 108 (FIG. 1). The subject matter of the interactive program 206 may be associated with the subject matter of the program 204.

An access trigger 208, 214 may be provided at times of interest relative to the associated program that is being presented on the presentation device 120. Access trigger 208, 214 may be provided from time to time, periodically, or at a single time, as determined by a program provider 104, information provider 138, and/or program distributor 106.

Program 204, along with a plurality of other programs, may be aggregated, interleaved, or otherwise combined (multiplexed) into signal 210. Accordingly, the signal commonly contains many programs, each carrying unique program content. Further, any given program may have multiple interactive programs associated therewith. That is, the program 204 and/or associated interactive program 206 received from the plurality of content providers 104a-104i is commonly communicated in a signal 210 from the program distributor 106.

At appropriate times, an access trigger 208 is added into the signal 210, or added into information that signal 210 is generated therefrom. When the portion of the program 204 that is communicated at substantially the same time as the access trigger 208 is received by receiving device 118, the information corresponding to the program 204 and information corresponding to the access trigger 208 are presented together on presentation device 120.

It is to be appreciated that a plurality of interactive programs 212 may be added into signal 210, or added into information that signal 210 is generated therefrom. The other interactive programs 212 may be substantially the same as the above-described interactive program 206, such as when different types of receiving devices 118 require variations of a similar or common interactive program. Thus, the interactive program 212 is responsive to its respective associated access trigger 214.

Alternatively, the other interactive programs 212 may provide different interactive content, such as when different clients wish to advertise their products at different times to the user of the program 204. Such interactive programs 212 may have an associated access trigger 214 added into the signal 210 at selected times. When the portion of the program 204 that is communicated with the access trigger 214 is received by receiving device 118, the program 204 and information corresponding to the access trigger are presented together on presentation device 120. In some situations, multiple different access triggers corresponding to different interactive programs may be concurrently presented.

Figure 3:
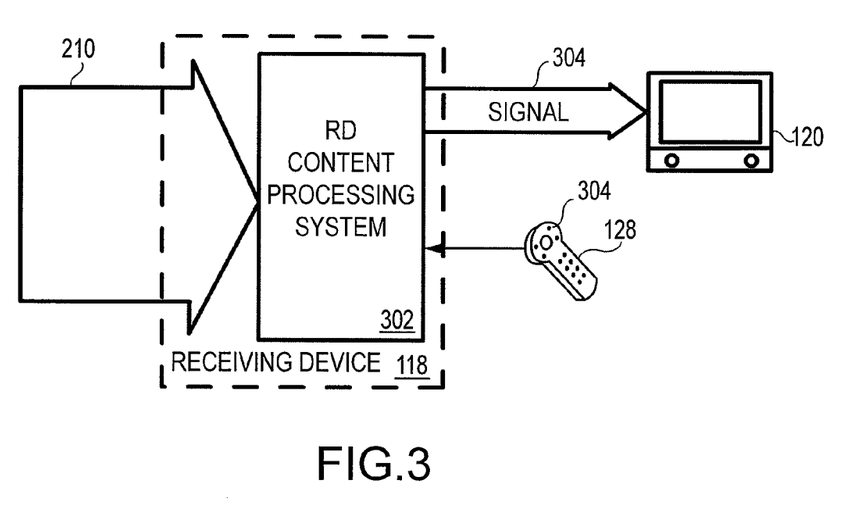
FIG. 3 is a block diagram of an STB content processing system operable to generate a signal for presenting the program and an access trigger, and further operable to generate a signal for presenting the interactive program upon selection of the respective access trigger.

FIG. 3 is a block diagram of a receiving device (RD) content processing system 302. RD content processing system 302 outputs a suitable signal 304 formatted for presentation device 120. Upon receipt of the signal 304, presentation device 120 presents video and/or audio information of signal 304.

Signal 304 is based upon a program selected by a viewer of presentation device 120. When no access trigger is in signal 210, signal 304 includes the program of interest that has been selected for presentation by a viewer. For example, but not limited to, a viewer may select a particular television program for presentation, such as program 204. It is appreciated that the selected program 204 is communicated in signal 210 to the receiving device 118. Signal 210 may include other programs therein in addition to the selected program 204.

At times, an access trigger 208, 214 may be in the signal 210. In response to receiving the signal 210 with an access trigger 208, 214 therein, RD content processing system 302 communicates signal 304 to presentation device 120 having the selected program 204 and the access trigger 208, 214. Accordingly, the selected program 204 and the access trigger 208, 214 is presented on presentation device 120.

D. Timing and Presentation of the Access Trigger

FIGS. 4A-4D illustrate one embodiment for presenting information corresponding to a communicated program, an interactive program, and an access trigger. As noted above, the RD content processing system 302 generates and communicates a signal to presentation device 120, user device 122, and/or another presentation or user device. When the access trigger 208 is not present in signal 210, the generated signal 304 corresponds to the program content information 402 illustrated in FIG. 4A. For example, assuming that the program 204 in signal 210 corresponds to a movie, the generated signal 304 communicates video and audio information to the presentation device 120 so that the user is able to watch the movie (the program content information 402).

Figure 4A:
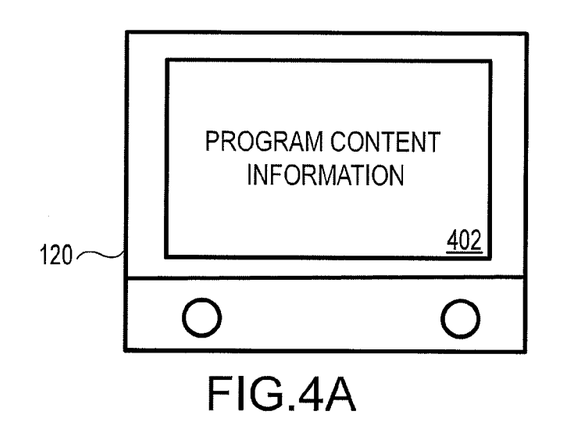
FIGS. 4A-4D illustrate presentation of information corresponding to the communicated program, the interactive program, and the access trigger.

At various times during the communication of the program 204, the access trigger 208 may be added into signal 210. Timing of the addition of the access trigger 208 into signal 210 is preferably coordinated with the subject matter of the program 204. (However, coordinated insertion of the access trigger 208 into signal 210 is not essential. That is, the access trigger 208 may be communicated at other times.)

As a simplified illustrative example, assume that the program 204 is an action film wherein the famous spy, in a driving scene, is driving a new prototype automobile. A manufacturer or seller of the prototype automobile may wish to have the user view an advertisement or other related interactive program pertaining to the prototype automobile. It would be desirable to provide the user an opportunity to access the interactive program 206 during or near to the showing of the prototype automobile in the action film. In some embodiments, a marker, a time, or other indicia associated with the prototype automobile is used to indicate to the RD content processing system 302 "when" the access trigger information 406 is to be presented at a desired point in the action film.

Figure 4B:
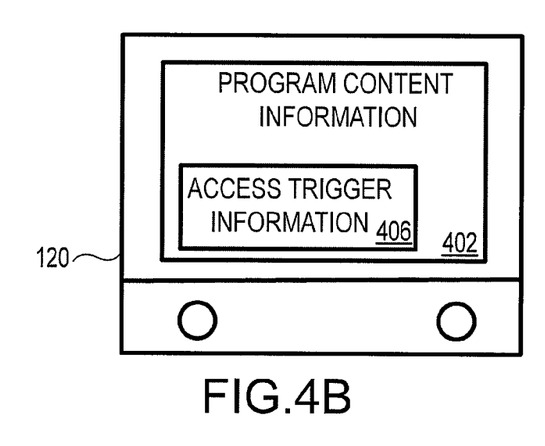

As noted above, when the access trigger 208 is received by the RD content processing system 302, the signal 304 communicated to presentation device 120 is changed such that the access trigger information 406 is presented, as illustrated in FIG. 4B. Preferably, the access trigger information 406 is concurrently presented with the program content information 402 in a manner that does not significantly interrupt viewing of the presented program content information 402. Any suitable form may be used for the presented access trigger information 406, including alpha-numeric text, symbolic icons, and/or other graphics. Access trigger information 406 may be presented at any suitable location on the display of presentation device 120. Any suitable size for the access trigger information 406 may be used. The access trigger 208 may also cause the RD content processing system 302 to change the signal to include audio information pertaining to the subject matter of the interactive program 206.

It is appreciated that the different forms of the access trigger information 406 is nearly limitless. Accordingly, for brevity, such numerous possible access trigger information 406 are not described herein. It is to be appreciated that all such variations in the type and nature of the access trigger information 406 is within the scope of this disclosure.

In some embodiments, presentation of the access trigger information 406 remains viewable for a brief period so as not to be distracting to the user. Accordingly, at some predefined time, the RD content processing system 302 changes the signal 304 to end presentation of the access trigger information 406.

Figure 4C:
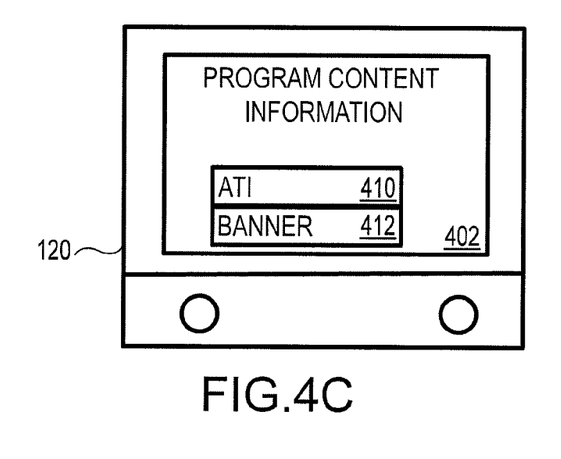

After ending the presentation of the access trigger information 406, embodiments may keep the access trigger 208 enabled. That is, the user is able to access the interactive program 206 by selecting the access trigger 208. One exemplary embodiment is operable to present an access trigger invitation 402 along with a banner 412, as illustrated in FIG. 4C. Banner 412 may be another graphical indicia presented to the user for a different purpose. For example, the banner 412 may be information describing the program content, which is presented when the user actuates an "information button" or the like on remote 128 (FIGS. 1 and 3). As another non-limiting example, the user may actuate a channel selection system that presents a banner describing program content on alternative channels, often referred to as an electronic programming guide (EPG) or the like. The access trigger invitation 410 may be presented with any suitable banner 412.

Selection of the access trigger 208, 214 may be effected in a variety of manners. For example, a button 304, actuator, or the like on remote 128 may have its focus changed to correspond to selection of the access trigger 208, 214 at times when an access trigger invitation 410 is presented, as described in greater detail hereinbelow. "Focus" is the operational functionality associated with a particular button, actuator or the like. Focus may be a fixed functionality, or may be changed based upon the particular functionality required at that time. For example, "power" button may have a fixed functionality of turning on or off a device. An "enter" button may have a plurality of different situational dependent functions.

Other devices and or systems may be used to cause selection of the access trigger 208, 214. For example, special dedicated actuators, such as buttons or switches, may reside on remote 128, on receiving device 118, or on another device. A menu system or the like presented on presentation device 120, or presented on a display on remote 128, may be used to select the access trigger 208, 214. It is appreciated that any suitable system and/or method of selecting the access trigger 204 may be used to select access trigger 208, 214.

Figure 4D:
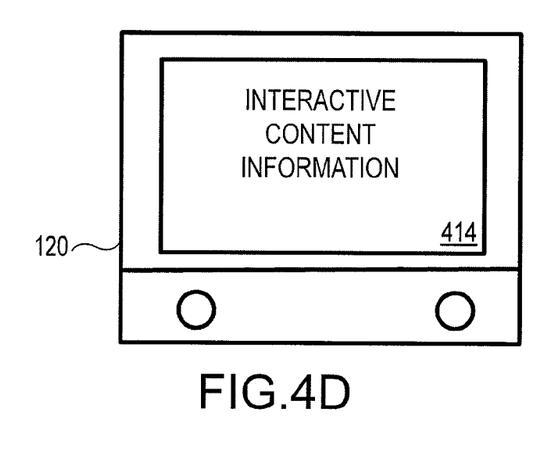

As noted above, embodiments present the interactive content information 414, after selection of the access trigger 208, on presentation device 120, as illustrated in FIG. 4D. That is, after a portion of the interactive program 206 is downloaded, processed, and launched, the RD content processing system 302 changes the signal 304 to present the interactive content information 414.

E. Communicating Interactive Programs and Access Triggers

Figure 5:
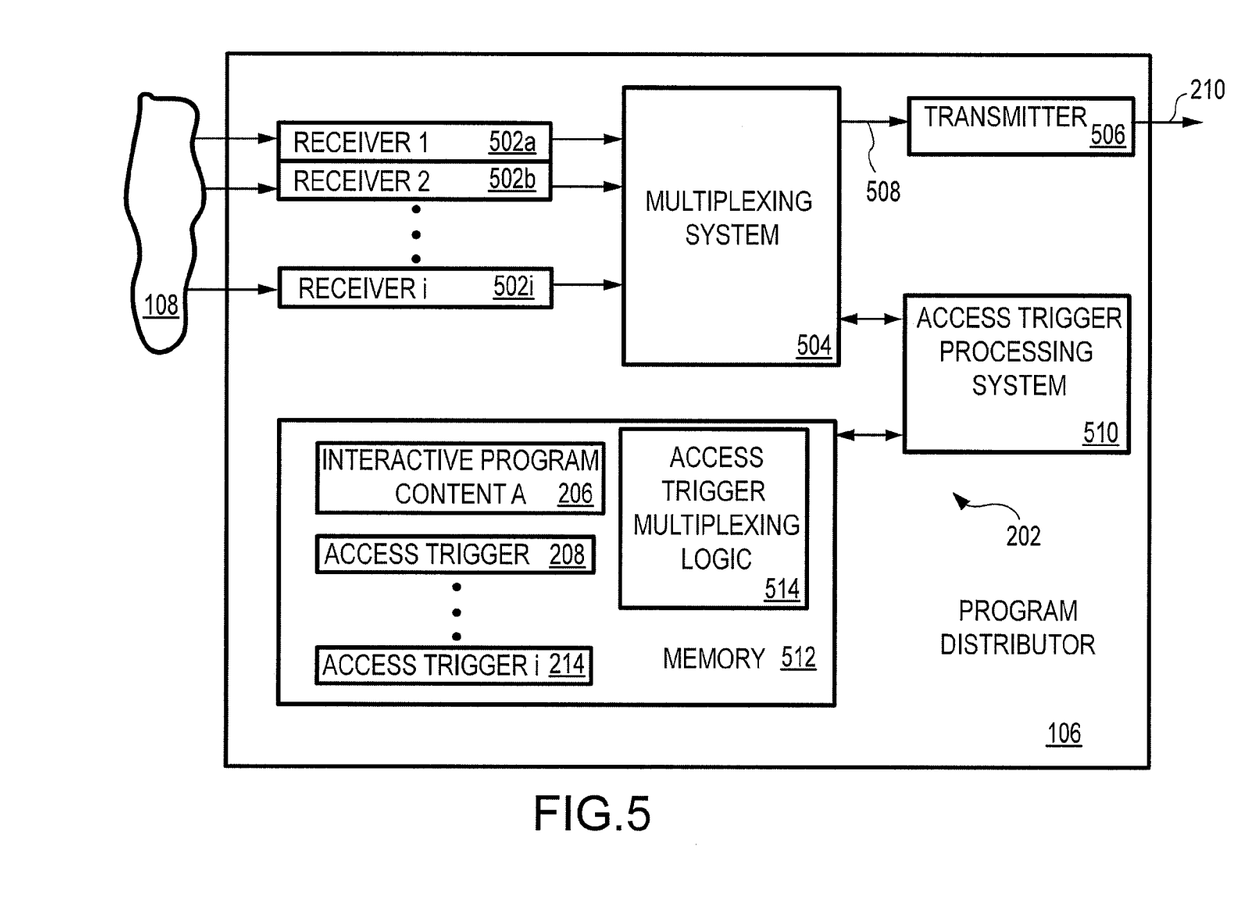
FIG. 5 is a block diagram illustrating an exemplary program content communication center in communication with an embodiment of the interactive program and access trigger system.

FIG. 5 is a block diagram illustrating an exemplary program distributor 106 in communication with an embodiment of the interactive program and access trigger system 100. As noted above, program 204, interactive program 206, and at various times, an access trigger 208, are combined and communicated in a single signal 210 to a receiving device 118. This function may be performed at the program distributor 106. However, other embodiments may reside at other suitable locations.

A plurality of receivers 502a-502i are communicatively coupled to communication system 108. The receivers 502a-502i receive program 204 provided by the content providers 104a-104i. Some receivers 502 also receive interactive program 206, 212, and/or access triggers 208, 214, provided by the content providers 104a-104i, information providers 138a-138i, or another provider (not shown).

Multiplexing system 504 is communicatively coupled to the receivers 502, transmitter 506, and access trigger processing system 510. Multiplexing system 504 generates a signal 508 with a plurality of programs, each program corresponding to unique program content associated with a channel. Further, multiplexing system 504 combines the interactive programs 206, 212 and/or access triggers 208, 214 (FIG. 2) into the signal 508.

The signal 508 generated by the multiplexing system 504 is communicated to transmitter 506. Transmitter 506 communicates a signal 210 with the programs therein, via a suitable medium, to the receiving device 118. For example, the signal 210 with the programs may be communicated using a satellite signal, via satellite antenna 110, satellite 112 and antenna 114, as described above. The signal 210 with the programs may alternatively be communicated to the receiving device 118 via a cable system or the like in the communication system 108 to which the receiving device 118 is directly, or indirectly, coupled to.

As described herein, some embodiments combine the access triggers 208, 214 into the signal 508 when they are received from content providers 104a-104i. Or, the access triggers 208, 214 may already reside in the information received from the content providers 104a-104i. The transmitter 506 receives the signal 508, and after processing and modification, communicates a corresponding signal 210. For example, if transmitter 506 communicates signal 210 to satellite 112 (FIG. 1), the signal 508 is processed and modified into a wireless signal. Alternatively, if signal 210 is communicated over a cable system, fiber optics system, or the like, the signal 508 is processed and modified into a signal suitable for communication over that particular system.

Furthermore, information providers 138a-138i or another provider (not shown) may separately provide access triggers 208, 214. The separately provided access triggers 208, 214 are then combined into the signal 508 at an appropriate time so as to be coordinated with presentation of the program 204.

Such separately provided access triggers 208, 214 may be stored in a convenient location, such as memory 512. As noted above, a marker, a time, or other associated indicia may be used to indicate to the content processing system 202 "when" the access trigger information 406 is to be communicated in signal 210. Thus, the marker, time, or other indicia may be used to indicate to the content processing system 202 "when" multiplexing system 504 is to combine the access triggers 208, 214 (FIG. 2) into the appropriate signal with the program 204. The separately provided access triggers 208, 214 may be received in any suitable format, such as in a communication received from communication system 108 or in a physical media, such as, but not limited to, an optical storage media, a magnetic tape media or a smart card.

In some embodiments, the interactive program 206, 212 may already reside in the information received from the content providers 104a-104i. Thus, the interactive program 206, 212 is communicated along with the program 206, 212 in the signal 210 without additional processing on the part of the content processing system 202.

Alternatively, information providers 138a-138i or another provider (not shown) may separately provide the interactive program 206, 212. The separately provided interactive program 206, 212 may be received in any suitable format, such as in a communication received from communication system 108 or in a physical media, such as, but not limited to, an optical storage media, a magnetic tape media or a smart card.

Such separately provided interactive program 206, 212 may be stored in a convenient location, such as memory 512. Thus, the interactive program 206, 212 does not have to be continuously provided with the program 204. Accordingly, a marker, a time, or other associated indicia may be used to indicate to the content processing system 202 "when" multiplexing system 504 is to retrieve the interactive programs 206, 212 such that they are included in signal 508 with the program 204.

The above-described multiplexing operations wherein the interactive program 206, 212 and/or access triggers 208, 214 are retrieved from memory 512 and combined into the appropriate signal 508 with the program 204 are controlled by the access trigger processing system 510. Access trigger multiplexing logic 514 may be retrieved and executed by the access trigger processing system 510 to perform the multiplexing operations. The access trigger multiplexing logic 514 is illustrated as residing in memory 512 for convenience. Alternatively, the access trigger multiplexing logic 514 may reside in another memory media (not shown), or may be combined with other logic.

For convenience, the access trigger processing system 510 and memory 512 are illustrated and described as separately residing apart from the multiplexing system 504. It is appreciated that the access trigger processing system 510 and/or memory 512 may reside in other locations, such as within multiplexing system 504, as a component of other systems, or as a stand-alone dedicated system or memory.

Multiplexer system 504 is illustrated for convenience as a separate component operable to receive one or more signals with program 204 from another multiplexer system, and operable to combine the interactive program 206, 212 and/or access triggers 208, 214 (FIG. 2) into the appropriate signal with the program 204. As another example, such a multiplexer system 504 may be located at a content provider 104 or information provider 138, and combine the interactive program 206, 212 and/or access triggers 208, 214 into the appropriate signal with the program 204. In another embodiment, two multiplexer systems 504 may be used, where a first multiplexer system 504 combines the interactive program 206, 212 into the appropriate signal with the program 204, and the second multiplexer system 504 combines the access triggers 208, 214 into the appropriate signal with the program 204. The two multiplexer systems 504 may be in the same or different locations.

F. Receiving Interactive Content and an Access Trigger

Figure 6:
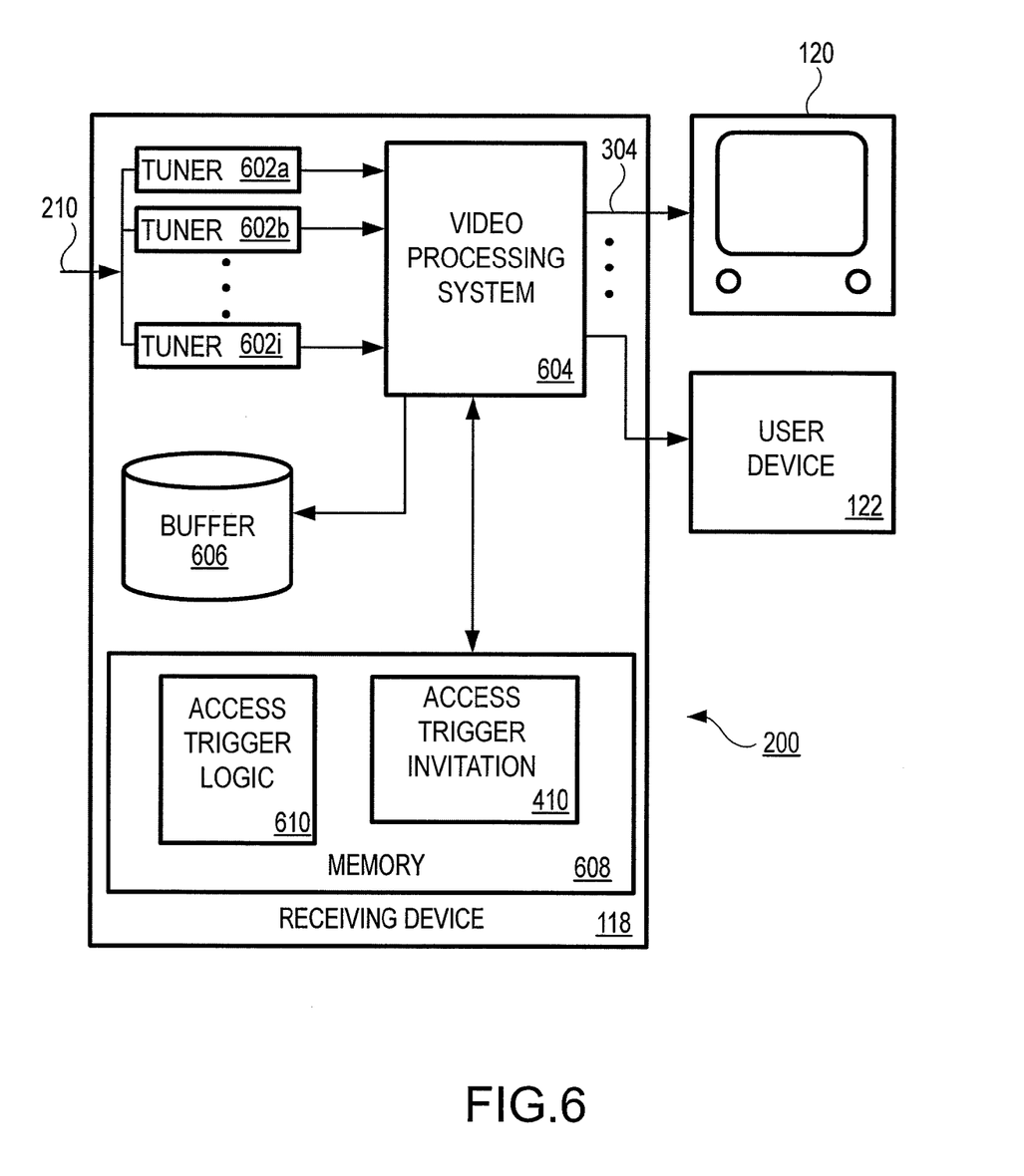
FIG. 6 is a block diagram illustrating an exemplary receiving device 118 in which an embodiment of the interactive program and access trigger system may be implemented

FIG. 6 is a block diagram illustrating an exemplary receiving device 118 in which an embodiment of the interactive program and access trigger system 100 may be implemented. The exemplary receiving device 118 includes a plurality of tuners 602a-602i, a video processing system 604, a buffer 606 and memory 608. Access trigger logic 610 resides in memory 608. Further, access trigger invitations 410 may be reside in memory 608.

In this exemplary embodiment, a tuner receives the signal 210 from the antenna 114 and tunes to the received signal 210 having the selected program 204 (FIG. 2). Video processing system 604 receives the signal from the tuner, and processes the received program 204 into the signal 304.

Some receiving devices 118 may include buffer 606. Buffer 606 may be a hard-drive memory system or other suitable memory system operable to store the program 204 and/or the interactive program 206 from a received signal 210. Thus, when presentation of an interactive program ends, the program 204 may be retrieved and presented.

Video processing system 604 may further perform a variety of functions during the processing of the program which is ultimately communicated to the presentation devices 120 or user devices 122. Non-limiting examples include decryption of secure signals, demodulation of information in the received signals, formatting the information in the output signal into a digital or analog signal, preparing an electronic programming guide (EPG), or providing various "trick" functionalities that are presented to the user in selectable formats. Other functions not described above may also be performed by the video processing system 604.

At some point, an access trigger 208 is received in the signal 210. Video processing system 604 recognizes the access trigger 208 and changes the signal 304 such that the access trigger information 406 is presented on the presentation device 120 with the presentation of the program content information 402.

In some embodiments, the access trigger information 406 is presented for a relatively brief period. At the end the period, if no selection of the access trigger 208 is received, the video processing system 604 changes the signal 304 so that the interactive content information 414 is no longer presented on presentation device 120. The length of the period in which the access trigger 208 is presented may be predefined. In some situations, the period may be a few seconds so as to provide sufficient notice to the user and sufficient time for the user to effect selection of the access trigger 208 if desired. In other situations, the access trigger 208 may be presented during a relevant portion of the program. For example, the program may be presenting an object of interest and the access trigger 208, related in some manner to the object of interest, is presented while the object of interest is presented.

In some embodiments, if no selection of the access trigger 208 is received by the end of the period for presentation of the access trigger information 406, a corresponding access trigger invitation 410 is generated and saved into memory 608. Access trigger invitation 208 is a storable counterpart to its respective access trigger, and therefore, contains information which identifies the related interactive program. That is, the access trigger 208 effectively remains available through its corresponding access trigger invitation 410.

The access trigger invitation 410 is not automatically presented on the presentation device 120. Presumably, the user is aware of the previously presented corresponding access trigger 208. If the user later becomes interested in accessing the interactive content information 414 associated with the access trigger 208 (which is no longer presented), the user may access the interactive program by selection of the access trigger invitation 410. That is, the interactive program 206 may be selected for presentation by a user after the access trigger information 406 is no longer presented on presentation device 120.

The access trigger invitation 410 may be retrieved from memory 608 and may optionally be presented with banner 412. A focus of a button or other actuator on remote 128, for example, may be operable to cause presentation of the access trigger invitation 410 on the presentation device 120. Thus, if user wants to access the interactive content information 414 related to a previously displayed access trigger 208, actuation of a corresponding button or actuator causes presentation of the access trigger invitation 410 (and optionally, the banner 412). Selection of the access trigger invitation 410 causes presentation of the interactive content information 414 as described herein.

In one embodiment, an access trigger 208 may remain active (by continued presentation of the access trigger information 410 or through its corresponding access trigger invitation 410) until the user changes from the current channel associated with the interactive content information 414 to a different channel of program content. Since the interactive content information 414 no longer presumably pertains to the current channel, the access trigger 208 and/or the access trigger information 410 is deactivated. In some embodiments, the access trigger 208 and/or the access trigger information 410 may remain active for a predefined number of events, such as, but not limited to, a predefined number of channel changes.

In some embodiments, the access trigger 208 and/or the access trigger information 410 may remain active for some predefined period of time after a channel change. For example, but not limited to, a user may be changing channels from time to time (channel surfing). Saving the access trigger 208 and/or the access trigger information 410 in an access trigger history or the like facilitates quicker access to an access trigger 208 and/or the access trigger information 410 if the user returns to the channel.

An interruption trigger may be received to deactivate a current access trigger 208 and/or the access trigger information 410. The interruption trigger may be inserted by the content provider 104 at a suitable point in the program 204, in the interactive program 206, and/or in signal 210. In some embodiments, the interruption trigger is inserted into the signal 210 at the program distributor 106 based upon a marker, a time, end of the program 204, or other indicia. Similarly, when an access trigger invitation 410 is to be deactivated, an interruption trigger may be communicated to the receiving device 118, such as in the signal 210. Upon receipt of the interruption trigger, the saved access trigger invitation 410 is deleted, erased, or otherwise deactivated.

Access trigger 208 (or its associated access trigger invitation 410) may be deactivated when a selection of the access trigger 208 is received. That is, if the user elects to view the interactive content information 414, there is no need to maintain an access trigger 208 (or its associated access trigger invitation 410) in an active state.

Access triggers 204 may themselves change from time to time, and accordingly, the changed access signal may be communicated to the receiving device 118 in signal 210. If a more recent access trigger 208 is received, the previously received access trigger 208 (or its associated access trigger invitation 410) is deactivated. That is, a more recent access trigger 208 may replace a previously received access trigger 208 (or the associated access trigger invitation 410).

In some embodiments, a more recent access trigger 208 may replace the information presented in as access trigger 208 (or information in the associated access trigger invitation 410), such that the presented information is updated by the more recent access trigger 208. Here, access to the interactive content information 414 via access to the current access trigger 208 is maintained.

Some events do not affect an access trigger 208. For example, if an identical access trigger 208 is received, some embodiments do not disable or otherwise replace a previously received access trigger 208 (or its associated access trigger invitation 410). Access triggers used for other purposes (not described herein) may be received from time to time. Such access triggers do not affect an access trigger 208 (or its associated access trigger invitation 410).

In some situations, a receiving device 118, such as an older model, or a model without or with limited interactive program capability, may not be operable to respond to the features of some interactive programs 206. For example, a receiving device 118 may only have sufficient capability to respond to certain types of interactive programming, and may not be operable with more advanced and/or complex interactive programming. In such situations, an indicia or other identifying information associated with a particular receiving device 118 may be included as part of an access trigger 208 so that such the receiving device 118 can determine that it is not to respond to an access trigger 208.

Some embodiments filter information in a received access trigger 208 to determine if a user has authorization to access the interactive program 206. For example, access may be restricted due to the nature of the interactive program 206, such as adult program oriented interactive program. Or, the received program 204 may have access restrictions, such as premium or pay-per-view content, where access to the associated interactive program 206 is also restricted. Or, the interactive program itself may have access restrictions, such as premium interactive program or pay-per-view interactive program. Access rights may be assessed by the receiving device 118 in any suitable manner to determine if the interactive program 206 is accessible. If not accessible, the access trigger information 406 and/or access trigger invitations 410 may not be presented on presentation device 120. Or if presented, access to the interactive program 206 may be prohibited or denied using another suitable process. Some embodiments are operable to allow a user to select to pay for the interactive program 206.

Some receiving devices 118 include a pause feature or the like so that received program 204 may be paused or temporarily halted. For example, the program 204 may be saved into buffer 606 or another suitable memory media for later playback. In some embodiments, received interactive program 206 and/or access triggers 208 are also saved into buffer 606 or another suitable memory media. In other embodiments, received interactive program 206 and/or access triggers 208 are not saved.

G. Other Alternative Embodiments

As noted above, some embodiments generate the access trigger information 410 from a received access trigger 208. Other embodiments may save the access trigger 208 itself and construct information for presentation of the access trigger information 410 therefrom. In other embodiments, the access trigger 208 is saved as the access trigger information 410.

The interactive program and access trigger system 202 (FIG. 2) may reside at any suitable location where access is available to at least both the program 204 and the associated interactive program 206. Thus, the content processing system 202 may be at the program distributor 106 (FIG. 1), at the location of the content provider 104, or at any other suitable location in the communication system 108.

As noted above, an access trigger 208 is added into the signal 210. The same or another content processing system 202 may add the access trigger 208 into the signal 210. Accordingly, the content processing system 202 which adds the access trigger 208 into signal 210 may reside at any suitable location where access is available to the access trigger 208 and signal 210.

Some interactive programs 206 may be relatively small such that the interactive program 206 is not continuously communicated with the program 204 in signal 210. The interactive program 206 may be multiplexed into a signal and communicated as needed, such as on a periodic basis, from time to time, or in advance of communication of the access trigger 208. Such interactive programs 206 may be saved into buffer 606, memory 608, or into other suitable media in the receiving device 118 for later retrieval when needed.

In some embodiments, a plurality of access trigger invitations 410 are generated and stored into memory 608 upon receipt of the access trigger 208. The plurality of stored access trigger invitations 410 may be stored in an access trigger history. If a selection of a particular access trigger 208 is received, the saved access trigger invitation 410 in no longer needed, and accordingly, may be deleted or otherwise erased.

Alternatively, if a selection of a particular access trigger 208 is received, the saved access trigger invitation 410 may continue to be saved for later use. For example, the user may view and/or interact with the interactive content information 414, and thus interact with the interactive program 206, for some period of time, and then return to viewing the program content information 402. The saved access trigger invitation 410 may be retrieved from memory 608 and presented if the user wishes to return to the interactive content information 414.

Figure 7:
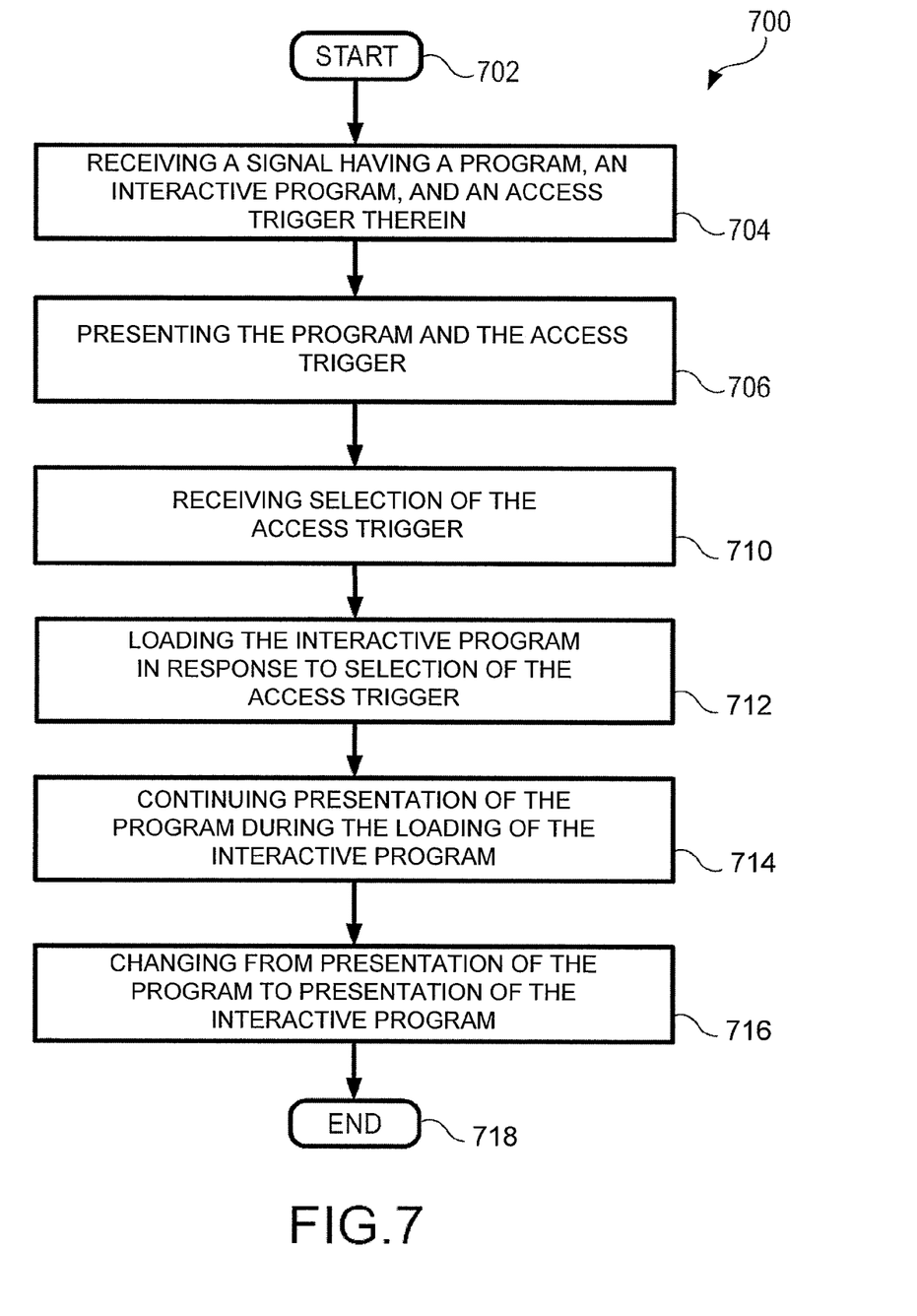
FIG. 7 is a flowchart illustrating a process used by an exemplary embodiment of the interactive program and access trigger system implemented in a presentation device.
Figure 8:
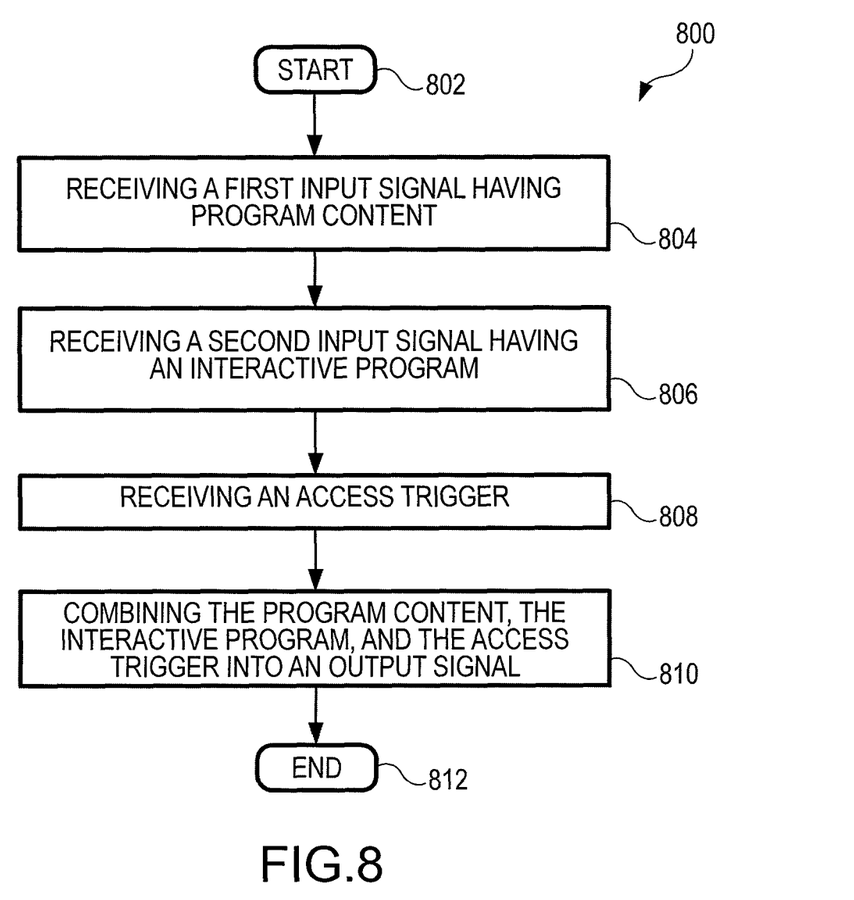
FIG. 8 is a flowchart illustrating a process used by an exemplary embodiment of the interactive program and access trigger system implemented at a program content communication center.

FIGS. 7 and 8 are flowcharts 700 and 800, respectively, illustrating processes used by an embodiment of an interactive program and access trigger system 100 (FIG. 1). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 7, the process 700 is ongoing with operation of the receiving device 118 (FIG. 1), and is illustrated as starting at 702. At 704, a signal having a program, an interactive program, and an access trigger therein is received. At 706, the program and the access trigger are presented on a presentation device. At 708, selection of the access trigger is received. At 710, presentation of the program is continued during the loading of the interactive program. At 712, presentation of the program is changed to presentation of the interactive program in response to selection of the access trigger. The process ends at 714.

With respect to FIG. 8, the process 800 is ongoing with operation of the receiving device 118 (FIG. 1), and is illustrated as starting at 802. At 804, a first input signal is received having program content. At 806, a second input signal is received having an interactive program. At 808, an access trigger is received. At 810, the first input signal with the program content, the second input signal with the interactive program, and the access trigger are combined into an output signal. The process ends at 812.

While various embodiments have been described hereinabove, it is to be appreciated that various changes in form and detail may be made without departing from the spirit and scope of the invention(s) presently or hereafter claimed.

The invention claimed is:

1. A method for accessing interactive programming, comprising:
   receiving a signal having a program, an interactive program, and an access trigger therein, said access trigger configured, upon selection, to load the interactive program, and wherein the program is video content;
   presenting the program and the access trigger on a presentation device;
   loading, in response to selection of the access trigger by a user, the interactive program that was received in the signal having the access trigger;
   ending presentation of the access trigger on the presentation device absent a selection of the access trigger by the user during a time period;
   generating, in response to ending presentation of the access trigger, an access trigger invitation from the access trigger;
   storing the generated access trigger invitation in a memory location; and
   if the access trigger is selected:
      continuing presentation of the program during the loading of the interactive program;
      changing from presentation of the program to presentation of the interactive program in response to completion of the loading of the interactive program;
      storing the program during presentation of the interactive program; and
      presenting the stored program after presentation of the interactive program.

2. The method of claim 1, further comprising:
   receiving the access trigger during presentation of the program; and
   presenting the access trigger on the presentation device concurrently with presentation of the program.

3. The method of claim 1, further comprising:
   presenting the access trigger invitation on the presentation device in response to a user input;
   loading the interactive program in response to receiving selection of the access trigger invitation by the user;
   continuing presentation of the program during the loading of the interactive program;
   changing from presentation of the program to presentation of the interactive program in response to completion of the loading of the interactive program.

4. The method of claim 1, further comprising:
   presenting the access trigger invitation on the presentation device in response to user input; and
   maintaining activation of the access trigger invitation until a current channel is changed to another channel.

5. The method of claim 1, further comprising:
   presenting the access trigger invitation on the presentation device in response to a user input; and
   maintaining activation of the access trigger invitation until an interruption trigger is received.

6. The method of claim 1, further comprising:
   presenting the access trigger invitation on the presentation device in response to a user input; and
   maintaining activation of the access trigger invitation until a second access trigger invitation is received.

7. The method of claim 1, further comprising:
   presenting the access trigger invitation on the presentation device in response to a user input; and
   maintaining activation of the access trigger invitation until the access trigger invitation is selected.

8. The method of claim 1, further comprising:
   receiving a second access trigger corresponding to the interactive program;
   generating a second access trigger invitation, the second access trigger invitation corresponding to the second access trigger; and
   storing the generated access trigger invitation into a memory.

9. The method of claim 1, further comprising:
   deleting the first access trigger invitation.

10. The method of claim 1 wherein receiving the signal comprises:
    receiving a second interactive program and a second access trigger in the signal; and
    presenting the program and the second access trigger on the presentation device.

11. The method of claim 10, where in response to selection of the second access trigger, comprising:
    loading the second interactive program;
    continuing presentation of the program during the loading of the second interactive program; and
    changing from presentation of the program to presentation of the second interactive program in response to completion of the loading of the second interactive program.

12. The method of claim 10, further comprising:
    ending presentation of the second access trigger after a time period;
    generating a second access trigger invitation from the second access trigger, the second access trigger invitation corresponding to the second access trigger; and
    storing the generated second access trigger invitation into a memory.

13. The method of claim 12, further comprising:
    presenting the second access trigger invitation on the presentation device, and in response to receiving selection of the second access trigger invitation;
    loading a second interactive program;
    continuing presentation of the program during the loading of the second interactive program; and
    changing from presentation of the program to presentation of the second interactive program in response to completion of the loading of the second interactive program.

14. The method of claim 11, further comprising:
    changing from presentation of the program to presentation of the interactive program in response to selection of the first access trigger invitation; and
    changing from presentation of the program to presentation of the second interactive program in response to selection of the second access trigger invitation.

15. A system which accesses interactive programming, comprising:
    a tuner operable to receive a signal having a program, an interactive program, and an access trigger therein, said access trigger configured, upon selection, to load the interactive program, and wherein the program is video content;
    a processing unit communicatively coupled to the tuner and operable to process the received program and the access trigger into a signal for presentation of the program and the access trigger on a presentation device;

a memory location operable to store an access trigger invitation;
and
a user interface device communicatively coupled to the processing system and operable to communicate a selection of the access trigger by a user to the processing system, where in response to communicating the selection of the access trigger to the processing system, the processing system loads the interactive program received in the signal having the access trigger, continues presentation of the program during the loading of the interactive program, changes from presentation of the program to presentation of the interactive program in response to completion of the loading of the interactive program, stores the program during presentation of the interactive program and presents the stored program after presentation of the interactive program,
wherein the processing unit is configured, absent the selection of the access trigger by a user within a period of time, to end the presentation of the access trigger on the presentation device and to generate the access trigger invitation corresponding to the access trigger, and
wherein the processing unit is further configured to store the access trigger invitation in the memory location.

16. The system of claim 15,
wherein in response to selection of the access trigger invitation, the processing system loads the interactive program, continues presentation of the program during the loading of the interactive program, and changes from presentation of the program to presentation of the interactive program in response to completion of the loading of the interactive program.

17. The system of claim 16 wherein the user interface device comprises:
a hand held remote operable to select the access trigger.

* * * * *